May 20, 1969     A. TEDESCHI     3,445,764

BRIDGE CIRCUIT WITH VARIABLE SCALE RATIO AND RESOLUTION

Filed Dec. 8, 1965

INVENTOR
A. TEDESCHI
BY J. L. Landis
ATTORNEY

United States Patent Office 3,445,764
Patented May 20, 1969

3,445,764
BRIDGE CIRCUIT WITH VARIABLE SCALE RATIO AND RESOLUTION
Anthony Tedeschi, Raytown, Mo., assignor to Western Electric Company, Incorporated, New York, N.Y., a corporation of New York
Filed Dec. 8, 1965, Ser. No. 512,456
Int. Cl. G01r 27/26, 11/52
U.S. Cl. 324—59          8 Claims

ABSTRACT OF THE DISCLOSURE

A conventional bridge circuit is modified by mechanically coupling a variable multiplier resistor to a balancing impedance so that as the balancing impedance is varied from a low value to a high value to balance the bridge, the multiplier resistor decreases so that each graduation on the balancing impedance readout scale between the low and high values is multiplied by a progressively decreasing factor to expand the scale and increase the resolution. Similarly, the coupling may be accomplished so that each graduation is multiplied by a progressively increasing factor to contract the scale.

---

Figure 1:
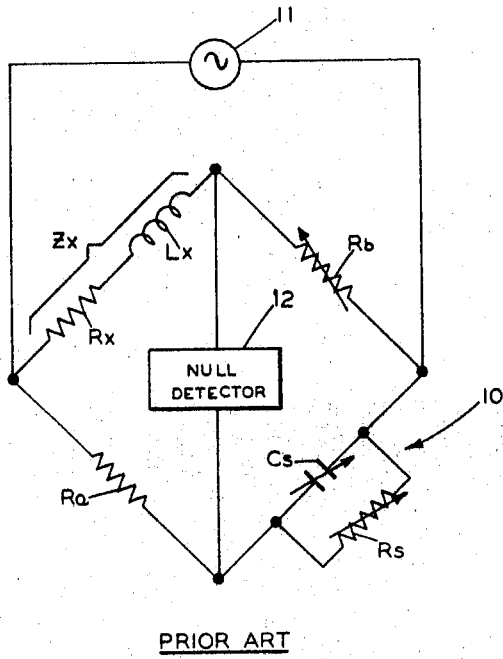

This invention relates to bridge circuits and, more particularly, to bridge circuits for measuring impedances having values lying within a known range. Accordingly, the general objects of this invention are to provide new and improved bridge circuits of such character.

Generally, conventional bridge circuits include at least one variable multiplier impedance and a variable balancing impedance having a graduated readout scale which indicates the value of the unknown impedance under test when the bridge is balanced, each graduation on the scale being multiplied by the value of the multiplier impedance. When it is desired to precisely measure an impedance having a value lying within a narrow range with such a bridge, generally only a relatively small portion of the readout scale is usable, even with the multiplier impedance set to an optimum value.

Accordingly, it is another object of this invention to provide new and improved means for expanding the readout scale of such a bridge to greatly improve the resolution and preciseness of the measurement.

In some instances it is necessary to measure impedances having values falling within a very wide range and to segregate or sort the impedances into categories according to their approximate values. Obviously, in such a case, high precision and resolution are not necessary. However, effecting measurements of this type with a conventional bridge will generally entail many changes in the value of the multiplier impedance during a measurement run, with the concomitant disadvantages of increased measurement time and operator fatigue.

Accordingly, it is still another object of this invention to provide new and improved means for contracting the readout scale of a conventional bridge so as to enable a plurality of impedances having values lying within a very broad range to be measured without changing the setting of the multiplier impedance.

With the foregoing and other objects in mind, a conventional bridge circuit is modified, in accordance with certain features of the invention, by mechanically coupling the variable multiplier impedance to the balancing impedance so that, as the balancing impedance is varied to balance the bridge, the multiplier impedance varies as a function of the position of the balancing impedance readout scale to multiply each graduation on the readout scale by a different factor to thereby transform the range of the scale in a manner such as to change the resolution thereof.

In one embodiment, the coupling between the balancing impedance and the multiplier impedance is such that, as the balancing impedance is varied from a low value toward a higher value, the multiplier impedance varies in a manner such that each graduation on the balancing impedance readout scale between the low and high values is multiplied by a progressively decreasing factor, thereby expanding the scale and increasing the resolution thereof.

In another embodiment, the coupling between the balancing impedance and the multiplier impedance is such that, as the balancing impedance is varied from a low value toward a higher value, the multiplier impedance varies in a manner such that each graduation on the balancing impedance readout scale between the low and high values is multiplied by a progressively increasing factor. This contracts the scale and enables a broad range of impedances to be measured without changing the setting of the multiplier impedance.

Figure 2:
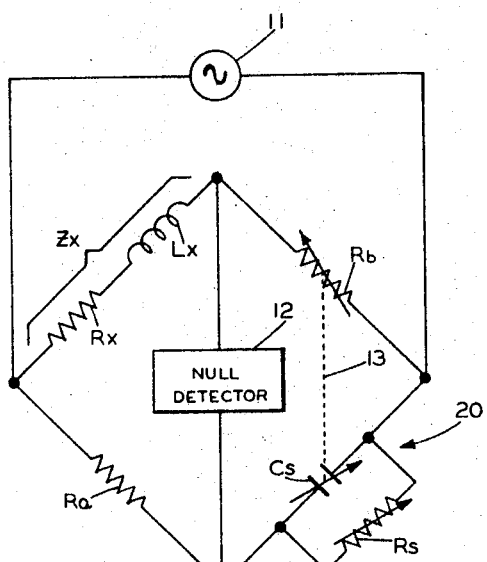

The invention, as well as its objects advantages and features, will be more fully understood from the following detailed description of specific embodiments thereof, when considered in conjunction with the appended drawings, wherein:

FIG. 1 is a schematic circuit diagram of a conventional Maxwell-Wien bridge; and FIG. 2 illustrates schematically a modified Maxwell-Wien bridge embodying certain features of the invention.

As an illustrative example, the invention will be described in connection with a Maxwell-Wien bridge for measuring inductive impedances.

Background

Referring to FIG. 1, there is shown a conventional Maxwell-Wien bridge 10 including a fixed multiplier resistor $R_a$ in one arm of the bridge, a variable multiplier resistor $R_b$ in a second arm of the bridge, the parallel combination of a variable balancing capacitor $C_s$ and a variable balancing resistor $R_s$ in a third arm of the bridge, and an unknown inductive impedance $Z_x$ of the form $R_x + j\omega L_x$ in a fourth arm of the bridge. An A.C. power source 11 is connected across one pair of opposed terminals of the bridge 10, and a suitable null detector 12 is connected across the other pair of opposed bridge terminals.

The bridge 10 may be balanced either by first varying $R_s$ until a first null is indicated by the null detector 12 and then varying $C_s$ until the null detector indicates a second null, or by first varying $C_s$ and then varying $R_s$. In either case, at balance, the value of $R_s$ indicates the value of $R_x$, and the value of $C_s$ indicates the value of $L_x$. Mathematically, as is well known, the value of $R_x$ and $L_x$ are given by the balance equations.

$$R_x = \frac{R_a R_b}{R_s} \qquad \text{Eq. (1)}$$

$$L_x = R_a R_b C_s \qquad \text{Eq. (2)}$$

Physically, the values of $R_x$ and $L_x$ are indicated by respective graduated scales or dials associated with $R_s$ and $C_s$, the scale reading being multiplied by the product of $R_a$ and $R_b$ (hereinafter designated K) which is also indicated by a suitable scale or dial.

Assume that it is desired to measure inductive impedances $Z_x$ with such a bridge, where the inductive parts $L_x$ of the impedances are known to have values falling within a narrow range of 40.0 to 41 microhenries ($\mu h$), and that is also desired to sort the impedance into 5 groups in accordance with their $L_x$ values.

Group: μh.

```
I _____ 40.0–40.2
II _____ 40.2–40.4
III _____ 40.4–40.6
IV _____ 40.6–40.8
V _____ 40.8–41.0
```

Also assume that the scale of the balancing capacitor $C_s$ runs from 0 to 100 with 100 graduations therebetween.

As should be apparent, no fixed multiplier could be selected which would enable the desired measurement and sorting to be effectively carried out with the bridge 10. However, the present invention, in one embodiment (discussed below under the heading First Embodiment), provides a modification to the bridge 10, which expands the readout scale thereof to increase the readout precision and resolution, and thereby enable the measuring and sorting to be accomplished accurately and easily.

In other instances, it might be desired to measure impedances having $L_x$'s with values running from 0 to 5000 μh. and to sort the impedance into 5 groups as follows:

Group: μh.

```
I _____ 0–25
II _____ 25–500
III _____ 500–1500
IV _____ 1500–3000
V _____ 3000–5000
```

Such measurements, of course, do not require high precision and resolution. However, as should be obvious, effecting the measurements with the bridge 10 will entail many changes of the multiplier resistor $R_b$, quite possibly a change each time an impedance is measured. To overcome this disadvantage, the present invention, in a second embodiment (discussed below under the heading Second Embodiment), provides a modification to the bridge 10 which enables the measurements to be performed without changing the setting of the multiplier resistor $R_b$.

*First embodiment*

Referring to FIG. 2, there is shown a Maxwell-Wien bridge 20 which is identical with the bridge 10 of FIG. 1, except that a mechanical coupling 13 is provided between the variable balancing capacitor $C_s$ and the variable multiplier resistor $R_b$ so that, as $C_s$ is varied to balance the bridge, $R_b$ varies as a function of the position of $C_s$. More specifically, the mechanical coupling is such that, as the value of $C_s$ increases, the value of $R_b$ decreases. The effect of this, as seen from Eq. 1, is to progressively decrease the multiplier K (i.e., the product of $R_a$ and $R_b$), which, in turn, results in an expansion of the $C_s$ scale with a concomitant increase in resolution of the measurement.

This will be better understood by referring to Table I which sets forth a scale transformation which might be employed in carrying out the narrow range measuring and sorting discussed above. In this example, the portion of the $C_s$ scale running from 40 to 45 is expanded to a transformed range of 40 to 41.

TABLE I

| $C_s$ scale | $C_s$(μμf.) | $K(R_a \times R_b)$ | $L_x = K \times C_s$ (μh.) |
|---|---|---|---|
| 40 | 40 | 1,000,000 | 40.0 |
| 41 | 41 | 980,488 | 40.2 |
| 42 | 42 | 961,905 | 40.4 |
| 43 | 43 | 944,186 | 40.6 |
| 44 | 44 | 927,273 | 40.8 |
| 45 | 45 | 911,111 | 41.0 |

The manner in which the multiplier resistor $R_b$ varies is selected in accordance with the amount of expansion necessary which, in turn, is a function of the resolution and precision required. The resistor $R_b$ may vary linearly with position or, as in the example set forth in Table I, may vary nonlinearly. Nonlinear variation of the resistor $R_b$ with position may be accomplished either by (1) a nonlinear resistor $R_b$ and linear coupling 13, (2) a linear resistor $R_b$ and a nonlinear coupling 13, or (3) a nonlinear resistor $R_b$ and a nonlinear coupling 13.

*Second embodiment*

In this embodiment the coupling 13 between the resistor $R_b$ and the capacitor $C_s$ is such that as $C_s$ increases, $R_b$ increases thereby progressively increasing the multiplier K. This has the effect of greatly contracting the scale of $C_s$.

Table II below sets forth a scale transformation which might be employed in carrying out the broad range measuring and sorting discussed above. The $C_s$ scale, in this instance, is transformed from a range of 0 to 100 to a range of 0 to 5000.

TABLE II

| $C_s$ scale | $C_s$(μμf.) | $K(R_a \times R_b)$ | $L_x = K \times C_s$ (μh.) |
|---|---|---|---|
| 0 | 0 | 0 | 0 |
| 20 | 20 | 1,250,000 | 25 |
| 40 | 40 | 12,500,000 | 500 |
| 60 | 60 | 25,000,000 | 1500 |
| 80 | 80 | 37,500,000 | 3000 |
| 100 | 100 | 50,000,000 | 5000 |

It is to be understood that the above-described embodiments are simply illustrative of the principles of the invention. Thus, while in the embodiments discussed above, the resistor $R_b$ was caused to vary as a function of $C_s$, it should be apparent that the resistor $R_a$ may be caused to vary in lieu thereof, or in addition thereto. It should also be noted that at balance $L_x = R_x R_s C_s$ and, accordingly, the balancing resistor $R_s$ may be caused to vary as a function of $C_s$ in lieu of or in addition to the resistors $R_a$ and $R_b$.

Further, while the invention has been described in connection with Maxwell-Wien bridge circuits, it should be apparent that it is equally applicable to other bridge circuits, such as Wheatstone bridges, resistance-ratio bridges, Hay bridges, resonance bridges, Schering bridges, Owen bridges, etc.

What is claimed is:

1. In a bridge circuit for measuring the value of an unknown impedance in one arm of the bridge circuit and including at least one variable multiplier impedance in a second arm and a variable balancing impedance having resistive and reactive portions and a graduated readout scale in a third arm for indicating the value of the unknown impedance when the bridge is balanced, the improvement which comprises:

means mechanically coupling the multiplier impedance to the reactive portion of the balancing impedance for varying the multiplier impedance as the balancing impedance is varied to balance the bridge, and for multiplying each graduation on the balancing impedance readout scale by a continuously different factor to transform the range of the scale and change the resolution thereof.

2. A circuit in accordance with claim 1, wherein the coupling between the balancing impedance and the multiplier impedance is such that, as the balancing impedance is varied from a low value toward a higher value, the multiplier impedance varies in a manner such that each graduation on the balancing impedance readout scale between the low and high values is multipied by a progressively decreasing factor to thereby expand the scale and increase the resolution thereof.

3. A circuit in accordance with claim 1, wherein the coupling between the balancing impedance and the multiplier impedance is such that, as the balancing impedance is varied from a low value toward a higher value, the multiplier impedance varies in a manner such that each graduation on the balancing impedance readout scale between the low and high values is multiplied by a progressively increasing factor to thereby compress the scale and decrease the resolution thereof.

4. In a bridge circuit for measuring the inductive value $L_x$ of an inductive impedance $Z_x$ in one arm of the bridge circuit and of the form $Z_x=R_x+j\omega L_x$, $L_x$ being known to have a value falling within a range given by the expression $a<L_x<b$, where:

$a$ is the lowest expected value of $L_x$, and $b$ is the highest expected value of $L_x$ and wherein the value of $L_x$ when the bridge is balanced is given by the expression $L_x=R_aR_bC_s$ where:

$R_a$ is a fixed multiplier resistor in a second arm of said bridge, $R_b$ is a variable multiplier resistor in a third arm of said bridge, and $C_s$ is a variable capacitor in a fourth arm of said bridge and having a graduated readout scale with a portion running from a value $c$ to a value $d$, where $c<a$ and $d>b$ and wherein the range $a-b$ is much smaller than the range $c-d$, the improvement with comprises:

means mechanically coupling the variable capacitor $C_s$ to the variable resistor $R_b$ for decreasing continuously the value of the resistor $R_b$ as the value of the capacitor $C_s$ increases toward the value $d$ to balance the bridge and multiply each graduation of the capacitor $C_s$ readout scale by a progressively decreasing factor to transform the readout scale portion from a range of $c-d$ to a range equal to $a-b$, and thereby greatly increase the resolution of the measurement.

5. In a bridge circuit for measuring the inductive value $L_x$ of an inductive impedance $Z_x$ in one arm of the bridge circuit and of the form $Z_x=R_x+j\mu L_x$ where $L_x$ is known to have a value falling within a range given by the expression $a<L_x<b$, where:

$a$ is the lowest expected value of $L_x$, and $b$ is the highest expected value of $L_x$ and wherein the value of $L_x$ when the bridge is balanced is given by the expression $L_x=R_aR_bC_s$ where:

$R_a$ is a fixed multiplier resistor in a second arm of said bridge, $R_b$ is a variable multiplier resistor in a third arm of said bridge, and $C_s$ is a variable capacitor in a fourth arm of said bridge and having a graduated readout scale with a portion running from a value $c$ to a value $d$, the range $c-d$ being much smaller than the range $a-b$, the improvement which comprises:

means mechanically coupling the variable compacitor $C_s$ to the variable resistor $R_b$ for increasing continuously the value of the resistor $R_b$ as the value of the capacitor $C_s$ increases toward the value of $d$ to balance the bridge and multiply each graduation of the capacitor $C_s$ readout scale by a progressively increasing factor to transform the readout scale portion from a range of $c-d$ to a range equal to $a-b$ and thereby greatly decrease the resolution of the measurement.

6. In a four-arm closed bridge circuit for measuring the value of an unknown impedance having an inductive component, the combination of a fixed resistor connected in a first arm, terminals to receive the unknown impedance connected in the second arm, a variable range resistor connected in the third arm, and a parallel variable resistor-variable capacitor network connected in the fourth arm, with a null detector connected across the juncture of the second and third arms and the juncture of the fourth and first arms, and a source of frequency signals connected across the juncture of the first and second arms and the juncture of the third and fourth arms, wherein the improvement comprises:

a coupling extending between the variable range resistor and the variable capacitor rendered effective upon varying the capacitor for varying the variable range resistor to accordingly adjust the sensitivity of the bridge to changes in value of the inductive components of various unknown impedances connected to the terminals in the second arm.

7. In a four-arm bridge circuit for measuring the value of an unknown impedance having an inductive component as set forth in claim 6;

wherein the coupling is made to vary inversely the variable range resistor as the capacitor is varied.

8. In a four-arm bridge circuit for measuring the value of an unknown impedance having an inductive component as set forth in claim 6;

wherein the coupling is made to vary directly the variable range resistor as the capacitor is varied.

References Cited

UNITED STATES PATENTS 2,872,639   2/1959   Hall _____ 324—57
2,939,079   5/1960   Willmore _____ 324—57 XR

OTHER REFERENCES

Dewar, "Simple Inductance Bridge Checks Unknown Coils," Radio-Electronics, TK 6540 R24, vol. 35, No. 7, July 1968, pp. 46–47.

Krueger, "Build A Precise Inductance Bridge," Radio-Electronics, TK 6540 R24, vol. 38, No. 9, September 1963, pp. 44–45.

RUDOLPH V. ROLINEC, *Primary Examiner.*

E. E. KUBASIEWIICZ, *Assistant Examiner.*